United States Patent [19]

Yazawa et al.

[11] 4,331,624
[45] May 25, 1982

[54] METHOD AND APPARATUS FOR BIAXIALLY STRETCHING A TUBULAR FILM

[75] Inventors: Masahide Yazawa; Hiroshi Yazawa, both of Kunitachi; Haruhisa Tani; Kazuhiko Kurihara, both of Tokyo, all of Japan

[73] Assignees: Nippon Petrochemicals Co., Ltd.; Polymer Processing Research Institute Ltd., both of Tokyo, Japan

[21] Appl. No.: 196,121

[22] Filed: Oct. 10, 1980

[30] Foreign Application Priority Data

Oct. 19, 1979 [JP] Japan .................................. 54-135568

[51] Int. Cl.³ ............................................. B29C 17/02
[52] U.S. Cl. ........................................ 264/160; 26/72; 26/82; 26/88; 26/90; 264/209.5; 264/289.6; 264/290.2
[58] Field of Search ................ 264/290.2, 235.8, 209.5, 264/160, 289.6; 26/72, 88, 90, 82

[56] References Cited

U.S. PATENT DOCUMENTS

| | | | |
|---|---|---|---|
| 2,976,567 | 3/1961 | Jones et al. | 264/209.5 |
| 2,988,772 | 6/1961 | Horn | 26/88 |
| 3,254,148 | 5/1966 | Nichols | 264/290.2 |
| 3,471,606 | 10/1969 | Corbett et al. | 264/209.5 |
| 3,472,924 | 10/1969 | Sederlund et al. | 264/209.5 |
| 3,807,004 | 4/1974 | Andersen | 264/290.2 |
| 3,950,469 | 4/1976 | Gneuss et al. | 264/209.5 |

Primary Examiner—James B. Lowe
Attorney, Agent, or Firm—Robert E. Burns; Emmanuel J. Lobato; Bruce L. Adams

[57] ABSTRACT

Longitudinal and transverse stretching of a tubular film is effected by gripping opposite selvages of the tubular film between a pair of substantially coplanar pulleys and a pair of endless belt means trained arcuately around the pulleys, respectively, and by rotating the pulleys at a peripheral speed greater than a speed of feed of the tubular film. As the film selvages progress along a pair of arcuate divergent paths, respectively, around the pulleys, the film is heated, reversed in direction of travel, and cut along the selvages into a pair of biaxially stretched sheets. Before stretching of the film, live steam is introduced into the tubular film for heating the same.

8 Claims, 3 Drawing Figures

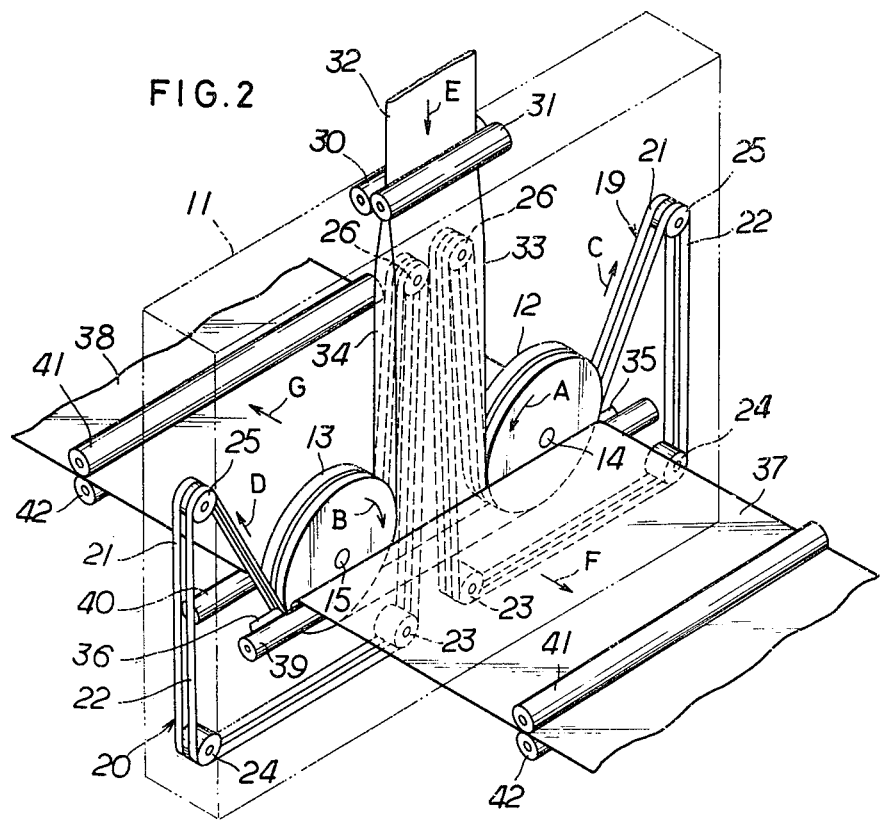

METHOD AND APPARATUS FOR BIAXIALLY STRETCHING A TUBULAR FILM

BACKGROUND OF THE INVENTION

1. Field of the Invention

The present invention relates to a method of and an apparatus for stretching a tubular thermoplastic polymer film biaxially or longitudinally and transversely at the same time.

2. Prior Art

A variety of methods and apparatus have been known for continuously stretching a tubular film biaxially in longitudinal and transverse directions.

Some representative prior art methods and apparatus are shown in the following patents:

British Pat. No. 1,113,136, patented May, 8, 1968; U.S. Pat. No. 3,472,924, patented Oct. 14, 1969; and U.S. Pat. No. 3,581,344, patented June 1, 1971.

SUMMARY OF THE INVENTION

A flattened tubular thermoplastic polymer film fed longitudinally at a first speed is gripped at both selvages thereof between a pair of substantially coplanar pulleys and a pair of endless belt means trained arcuately around the pulleys, respectively, the pulleys rotating in opposite directions at a peripheral speed greater than the first speed. The film is stretched longitudinally and transversely at the same time while the selvages are forced to advance along a pair of arcuate divergent paths, respectively, defined by interengaging portions of the pulleys and belt means. Live steam may be introduced into the tubular film while being longitudinally fed for heating the same before its longitudinal and transverse stretching takes place. The film may also be heated by being immersed in hot water while being stretched longitudinally and transversely, is reversed in direction of travel as the film is turned inside out across a line connecting the lowermost circumferential edges of the pulleys, and then is cut along the selvages into a pair of sheets after stretching at the end of the arcuate divergent paths.

It is an object of the present invention to provide a method of continuously stretching a tubular film biaxially or longitudinally and transversely at the same time in a manner completely different from the prior art noted above.

Another object of the present invention is to provide an apparatus for carrying out such a method.

Still another object of the present invention is to provide a method and apparatus for biaxially stretching a tubular thermoplastic polymer film at a high rate of speed and magnification of stretch without necking.

Still another object of the present invention is to provide an apparatus for biaxially stretching a tubular film, which apparatus is simple in structure, inexpensive to construct, and will take up a minimum of space.

Still another object of the present invention is to provide a method and apparatus for manufacturing biaxially stretched sheets from a tubular film less costly and at an increased rate of production.

The above and other objects, features and advantages of the present invention will become apparent from the detailed description when taken in connection with the accompanying drawings which illustrate a preferred embodiment of the present invention by way of example.

BRIEF DESCRIPTION OF THE DRAWINGS

FIG. 2 is an enlarged perspective view of the apparatus shown in FIG. 1; and

DETAILED DESCRIPTION

Figure 1:
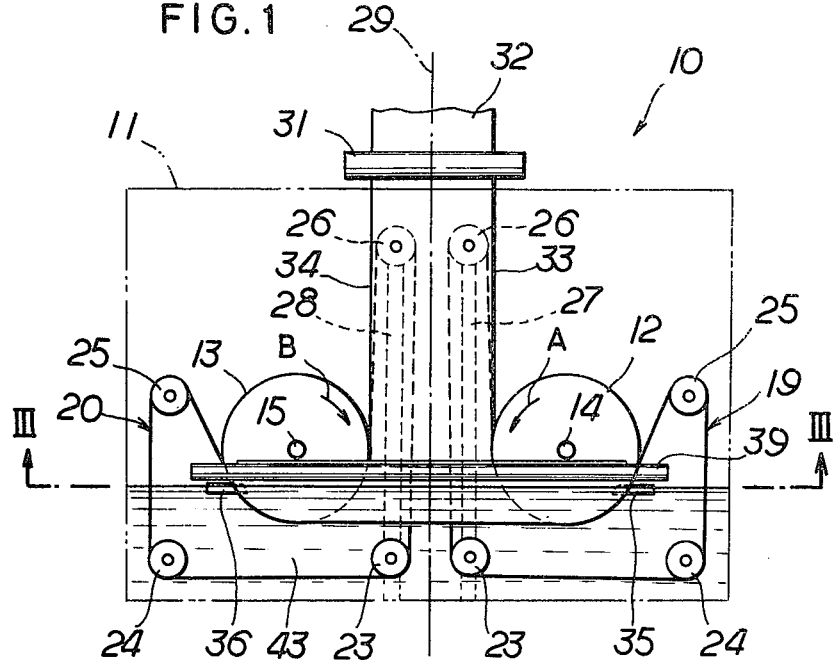
FIG. 1 is a schematic front elevational view of an apparatus constructed in accordance with the present invention.

As shown in FIGS. 1 and 2, an apparatus 10 for biaxially stretching tubular films comprises a housing or container 11 and a pair of substantially coplanar pulleys 12,13 of substantially the same dimensions disposed symmetrically in horizontal alignment across a vertical reference center line 29 (FIG. 1) and mounted respectively on a pair of horizontal shafts 14,15 suitably supported rotatably on the housing 11 and coupled through a transmission to an appropriate source of drive such as a motor (not shown), which upon energization causes the pulleys 12,13 to rotate in opposite directions as indicated by the arrows A and B, counterclockwise and clockwise, respectively, at the same peripheral speed. Although the pulleys 12,13 are shown to be rotatable in a substantially vertical common plane, they may be arranged to rotate in a plane that may be anywhere between vertical and horizontal.

Each of the pulleys 12,13 has a pair of parallel peripheral grooves 16,17 of a substantially V-shaped cross section (FIG. 3) and a central peripheral groove 18 disposed between the grooves 16,17.

A pair of endless belt means 19,20 is trained arcuately around the pulleys 12,13, respectively, in symmetrical relation with respect to the vertical reference line 29. Each of the endless belt means 19,20 comprises a pair of parallel V belts 21,22 received respectively in the peripheral V-shaped grooves 16,17 of one of the pulleys 12,13 and guided around idle rollers 23,24,25 and 26 that are rotatably supported in the housing 11. The guide rollers 23-26 are arranged such that the V velts 21,22 trained therearound are held in engagement with each of the pulleys 12,13 substantially through a lower, substantially semicircular, peripheral edge thereof. The rollers 26,26 are disposed in vertical alignment with the rollers 23,23, respectively, in vertically spaced relation thereto, the rollers 26,26 being located upwardly of the pulleys 12,13. A pair of vertical columns 27,28 (FIG. 1) extends upwardly from the bottom of the housing 11 and supports the rollers 26,26, respectively, on upper ends thereof. A piping (not shown) is mounted on the vertical columns 27,28 for introducing live steam into the housing 11.

A pair of horizontal pinch rollers 30,31 is disposed upwardly of the housing 11 for feeding a tubular film 32 in flattened form down a longitudinal path extending along the vertical reference line 29.

The tubular film 32 which is quenched after being extruded is fed downwardly in the direction of the arrow E by the pinch rollers 30,31 at a first speed toward a space between the pulleys 12,13. As the film 32 progresses, it envelops the rollers 26,26 and vertical runs of the V belts 21,22 and 21,22, which are positioned upwardly of the pulleys 12,13, whereupon the film 32 is supported at opposite edges or selvages 33,34 thereof by such vertical runs of the V belts. The selvages 33,34 are progressively pressed by the V belts 21,22 and 21,22 from inside the tubular film 32 against peripheries of the pulleys 12,13, which are rotated in the directions of the arrows A and B, respectively, at a peripheral speed greater than the first speed of the feed of the film 32. Rotation of the pulleys 12,13 causes the film selvages 33,34 to be progressively gripped tightly between the pulleys 12,13 and the V belts 21,22 and 21,22 running in the direction of the arrows C and D, respectively, and advanced along a pair of divergent paths, respectively, that correspond to the lower semicircular peripheral edges of the pulleys 12,13. Since the pulleys 12,13 rotate faster at their peripheries than the speed of feed of the film 32, the film 32 is stretched longitudinally and transversely as the film selvages 33,34 are carried by the pulleys 12,13 progressively away from each other.

Figure 3:
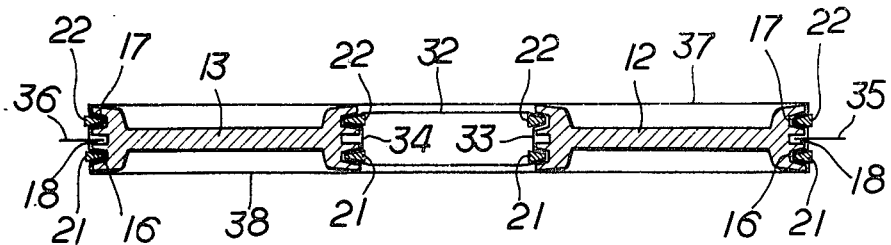
FIG. 3, appearing with FIG. 1, is an enlarged cross-sectional view taken along line III—III of FIG. 1.

As best illustrated in FIG. 3, the film selvages 33,34 are squeezed into and held in the V-shaped grooves 16,17 and 16,17, respectively, by the V belts 21,22 and 21,22, so that the selvages 33,34 are securely fastened around the pulleys 12,13 without slipping away during the stretching of the film 32.

The housing 11 includes at its lower portion a bath 43 (FIG. 1) of hot water at a temperature of 100° C. or less in which substantially lower halves of the pulleys 12,13 below the shafts 14,15 are immersed for heating the tubular film 32 as it is stretched. Before the film 32 enters the hot water bath 43, the film 32 is uniformly heated by live steam introduced at a pressure of 75-150 mm, or more, in terms of a water column through the piping on the vertical support columns 27,28 into the tubular film 32 which is thereby spread around the vertical runs of the V belts 21,22 below the rollers 26,26. With the film 32 thus heated before being stretched, the film 32 is prevented from lateral shrinkage or necking which would otherwise occur before arriving at the pulleys 12,13 due to longitudinal stretching of the film 32, and displace the vertical runs of the V belts 21,22 and 21,22 toward each other. The discharged live steam is sealed within the tubular film 32 by the pinch rollers 30,31 and the bath 43 of hot water against leakage or loss of steam.

The magnification of longitudinal stretch of the film 32 is dependent on the ratio of the peripheral speed of the pulleys 12,13 to the speed of feed of the film 32 by the pinch rollers 30,31. For example, when the peripheral speed of the pulleys 12,13 is set to be 3 to 4 times the speed of feed of the film 32, then the film 32 is stretched 3 to 4 times the original length.

The stretched film 32 is cut along the selvages 33,34 by a pair of cutter blades 35,36 into a pair of severed sheets 37,38, the cutter blades 35,36 extending into the central grooves 18,18 (FIG. 3) in the pulleys 12,13, respectively, adjacent to a position at which the film 32 is released from the pulleys 12,13 and from the V belts 21,22 and 21,22. Therefore, the magnification of transverse stretch of the film 32 corresponds to the ratio of the distance between the cutter blades 35,36 to the width of the folded tubular film 32 minus the width of the selvages 33,34.

The sheets 37,38 are withdrawn over a pair of rollers 39,40, respectively, in opposite directions as indicated by the arrows F and G by two pairs of withdrawal rollers 41,42 and 41,42 that rotate at a peripheral speed which is substantially the same as or, if additional longitudinal stretching is desired, greater than the peripheral speed of the pulleys 12,13. The rollers 39,40 and other associated withdrawal means such as drums (not shown) over which the sheets 37,38 pass may be heated to heat-set the sheets 37,38 for thermally stabilizing the same, or may remain cold to allow the sheets 37,38 to be heat-shrinkable at the time of use. During heat treatment of the sheets 37,38, the severed selvages are pressed by belts or other suitable means down against the heat-treatment drums to avoid thermal shrinkage. The selvages are cut off for reuse, before the sheets 37,38 are wound around suitable take-up reels.

The tubular film 32 moves downwardly until the selvages 33,34 reach the lowermost edges of the pulleys 12,13 where the film 32 is turned inside out, and then is reversed in direction of travel or begins to move upwardly after the selvages 33,34 have gone past such lowermost edges. This arrangement makes the overall structure of the apparatus 10 relatively compact in size. During downward movement of the film 32, the V belts 21,22 and 21,22 are subjected to lateral stresses as they are pulled by the selvages 33,34 that are being progressively spread apart. Such lateral stresses, however, are relatively small the amount of lateral stretching of the film 32 is comparatively small until it arrives at the lowermost edges of the pulleys 12,13. As the film 32 moves upwardly past the lowermost edges of the pulleys 12,13, the selvages 33,34 are held firmly against the peripheral edges of the pulleys 12,13 under increased lateral pull exerted by the film 32 which undergoes a rapidly increasing lateral stretch.

The tubular film 32 while being stretched longitudinally and transversely may be heated by a heating medium such as hot air, radiant heat such as infrared radiation, dry steam, or the like instead of hot water. Such alternatives are suitable especially where the pulleys 12,13 lie horizontally or are inclined.

Each of the endless belt means may comprise grooved belts, belts with small projections or belts having otherwise roughened surfaces. Alternatively, the pulleys 12,13 may be lined around their peripheries with grooved or roughened strips of a heat-resistant elastomer, and the endless belts may be cotton belts or wire ropes impregnated with rubber.

The apparatus 10 according to the present invention is suitable for stretching tubular films of various materials. More specifically, a variety of tubular films made of hydrophobic thermoplastic polymer can be stretched on the apparatus 10, such polymers including polyolefin, polyvinyl chloride, polyvinylidene chloride, polyacrylonitrile, polystyrene, polyester, polyamide, polyurethane, and copolymers thereof. Where tubular films of hydrophilic polymers such as polyvinyl alcohol are to be stretched, they should be heated by being immersed in a bath of a heated solution of salts such as sodium sulfate, ammonium sulfate or the like while being stretched, such heated solution being injected into the tubular film before the latter arrives at the bath, in which instance the solution is allowed to overflow to an extent necessary to maintain a desired liquid level in the bath.

EXAMPLE

To the apparatus 10 as shown in FIGS. 1 and 2 was supplied a quenched tubular film of polypropylene having a thickness of 0.18 mm and a folded width of 400 mm at the speed of 20 m/min. through the pinch rollers 30,31. The pulleys 12,13 having a thickness of 50 mm at the circumferential edges and a diameter of 470 mm were spaced 350 mm from each other and rotated initially at a peripheral speed equal to the speed of feed of the tubular film, while being immersed at lower semicircular halves in a bath of hot water approximately at 100° C. The lateral stretch obtained of the film was about 350% of the original lateral dimension. Then, live steam was introduced into the tubular film at an increasing pressure and at the same time the pulleys 12,13 were rotated progressively faster until the stretched film was withdrawn three times as fast as the film was supplied. After severance of the selvages, there were obtained sheets of film each stretched 300% longitudinally and 350% transversely having a width of 1,250 mm and a thickness of 0.017 mm. The stretched sheet, upon being cooled on a cold roller, was particularly useful for shrink packaging. After being heatset on a hot drum the film sheet had an elongation of 60–100% and found wide use in general, ordinary packaging and packing.

Biaxially stretched sheets of film of polyvinyl chloride or polystyrene produced in the same manner as in the EXAMPLE above were found particularly useful for shrink packaging.

Although a certain preferred embodiment has been shown and described in detail, it should be noted that many changes and modifications may be made therein without departing from the scope of the appended claims.

What is claimed is:

1. A method of biaxially stretching a tubular thermoplastic polymer film, comprising the steps of:
   (a) feeding the tubular film in flattened form longitudinally at a first speed;
   (b) supporting the film while being longitudinally fed at its opposite selvages from inside on a pair of belt means having respective portions disposed within the tubular film in abutment against the selvages thereof;
   (c) gripping the film selvages between said pair of belt means and the peripheries of a pair of substantially coplanar pulleys disposed outside the film, each of said belt means being trained around one of said pulleys through a substantially semicircular peripheral edge thereof;
   (d) rotating said pulleys in opposite directions at a peripheral speed greater than said first speed, whereby the film is stretched longitudinally and transversely and is turned inside out and reversed in direction of travel as the film selvages are advanced along a pair of divergent substantially semicircular paths, respectively, between said pulleys and said belt means;
   (e) heating the film during the longitudinal and transverse stretching thereof; and
   (f) cutting the stretched film at the selvages into a pair of sheets adjacent to a position where the film is released from the belt means and pulleys at the ends of said divergent substantially semicircular paths.

2. A method according to claim 1, said heating step (e) including immersing the film in hot water at a temperature of 100° C. or less while the film selvages are travelling along said divergent substantially semicircular paths.

3. A method according to claim 1 or 2, said heating step (e) further including introducing live steam into the tubular film during said supporting step (b).

4. An apparatus for biaxially stretching a tubular thermoplastic polymer film, comprising:
   (a) means for feeding the tubular film in flattened form at a first speed along a longitudinal path;
   (b) a pair of substantially coplanar pulleys disposed one on each side of said path and rotatable in opposite directions at a peripheral speed greater than said first speed;
   (c) a pair of endless belt means disposed symmetrically with respect to said path and extending along said longitudinal path between said pulleys for being located within the tubular film in abutment against the opposite selvages thereof, respectively, to support the film at the selvages from inside thereof as it is fed along said longitudinal path, said belt means being trained around said pulleys substantially through their respective substantially semicircular peripheral edges, respectively, for gripping the film at the selvages thereof respectively along a pair of divergent substantially semicircular paths between said pulleys and said belt means, whereby the film is stretched longitudinally and transversely and is turned inside out and reversed in direction of travel upon rotation of said pulleys;
   (d) means for heating the film during the longitudinal and transverse stretching thereof; and
   (e) means for cutting the stretched film at the selvages into a pair of sheets adjacent to a position where the film is released from said belt means and pulleys at the ends of said divergent substantially semicircular paths.

5. An apparatus according to claim 4, each of said pair of belt means comprising a pair of parallel V belts, and each of said pulleys having a pair of parallel V-shaped peripheral grooves receiving said V belts, respectively.

6. An apparatus according to claim 4, said cutting means comprising a pair of cutter blades disposed respectively adjacent to said pulleys and each projecting between said pair of parallel V belts received in said V-shaped peripheral grooves substantially at one of said ends of the divergent semicircular paths.

7. An apparatus according to claim 4, said heating means comprising a container for hot water at a temperature of 100° C. or less in which the film is immersed while the film selvages are travelling along said divergent substantially semicircular paths.

8. An apparatus according to claim 4 or 7, including means for introducing live steam into the tubular film before it is gripped between the pulleys and the belt means.

* * * * *